(12) United States Patent
Zhou

(10) Patent No.: US 11,652,864 B2
(45) Date of Patent: May 16, 2023

(54) METHOD AND APPARATUS FOR TRANSMITTING RESOURCES AND NON-TRANSITORY STORAGE MEDIUM

(71) Applicant: BEIJING DAJIA INTERNET INFORMATION TECHNOLOGY CO., LTD., Beijing (CN)

(72) Inventor: Chao Zhou, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/519,459

(22) Filed: Nov. 4, 2021

(65) Prior Publication Data

US 2022/0060533 A1    Feb. 24, 2022

Related U.S. Application Data

(63) Continuation of application No. PCT/CN2020/133755, filed on Dec. 4, 2020.

(30) Foreign Application Priority Data

Jan. 17, 2020    (CN) .......................... 202010054775.2

(51) Int. Cl.
*G06F 13/00*            (2006.01)
*H04L 65/80*            (2022.01)
(Continued)

(52) U.S. Cl.
CPC .............. *H04L 65/80* (2013.01); *H04L 47/38* (2013.01); *H04L 65/612* (2022.05); *H04N 21/2662* (2013.01); *H04N 21/64738* (2013.01)

(58) Field of Classification Search
CPC ....... H04L 65/80; H04L 47/38; H04L 65/612; H04L 65/613; H04L 65/70; H04L 65/762;
(Continued)

(56) References Cited

U.S. PATENT DOCUMENTS 9,124,642 B2 *   9/2015   Choudhury ........... H04L 67/303
9,294,531 B2 *   3/2016   Zhang ..................... H04L 65/80
(Continued)

FOREIGN PATENT DOCUMENTS

CN         101068236 A         11/2007
CN         102333089 A          1/2012
(Continued)

OTHER PUBLICATIONS

International search report of PCT application No. PCT/CN2020/133755 dated Feb. 18, 2021.
(Continued)

*Primary Examiner* — Kenneth R Coulter
(74) *Attorney, Agent, or Firm* — Knobbe, Martens, Olson & Bear, LLP

(57) ABSTRACT

The present disclosure provides a method for transmitting resources. The method includes: determining the target bitrate of a target moment; in response to the target bitrate being inconsistent with the current bitrate, acquiring target address information of a multimedia resource having said target bitrate; and sending to a server a frame acquisition request carrying the target address information, the frame acquisition request being used to instruct the server to return a media frame of said multimedia resource at the target bit rate.

16 Claims, 5 Drawing Sheets

(51) Int. Cl.
  *H04L 47/38* (2022.01)
  *H04N 21/2662* (2011.01)
  *H04N 21/647* (2011.01)
  *H04L 65/612* (2022.01)

(58) Field of Classification Search
  CPC ........... H04N 21/2662; H04N 21/6438; H04N 21/64738
  USPC ................................ 709/245, 217–219, 203
  See application file for complete search history.

(56) References Cited

U.S. PATENT DOCUMENTS

| | | | |
|---|---|---|---|
| 2011/0093605 A1* | 4/2011 | Choudhury | H04L 65/1059 709/231 |
| 2012/0093017 A1 | 4/2012 | Liu et al. | |
| 2014/0019633 A1 | 1/2014 | Zhang et al. | |
| 2015/0023404 A1 | 1/2015 | Li et al. | |

FOREIGN PATENT DOCUMENTS

| | | |
|---|---|---|
| CN | 102695081 A | 9/2012 |
| CN | 103338393 A | 10/2013 |
| CN | 103533386 A | 1/2014 |
| CN | 105025351 A | 11/2015 |
| CN | 109040801 A | 12/2018 |
| CN | 110636346 A | 12/2019 |
| WO | 2011047335 A1 | 4/2011 |

OTHER PUBLICATIONS

Extended European search report of counterpart European application No. 20913374.3 dated Jun. 27, 2022.
Chenghao Liu et al,., Client-Driven Joint Cache Management and Rate Adaptation for Dynamic Adaptive Streaming over HTTP, International Journal of Digitalmult Imedia Broadcasting, vol. 7, No. 4, Feb. 28, 2013, pp. 106-116, entire document.
First office action of Chinese application No. 202010054775.2 dated Nov. 15, 2021.

* cited by examiner

METHOD AND APPARATUS FOR
TRANSMITTING RESOURCES AND
NON-TRANSITORY STORAGE MEDIUM

CROSS-REFERENCE TO RELATED APPLICATIONS

The present disclosure is a continuation application of International Application No. PCT/CN2020/133755, filed on Dec. 4, 2020, which claims priority to Chinese Patent Application No. 202010054775.2, filed on Jan. 17, 2020, the disclosures of which are herein incorporated by reference in their entireties.

TECHNICAL FIELD

The present disclosure relates to the technical field of communications, and in particular to a method and an apparatus for transmitting resources.

BACKGROUND

With the development of communication technologies, users can browse audio and video resources on terminals anytime and anywhere. At present, when a server transmits audio and video resources to a terminal (commonly known as a "stream pulling phase"), a fragmentation-based media transmission method can be used.

The fragmentation-based media transmission method includes common Dynamic Adaptive Streaming over HTTP (DASH for short, which is a standard developed by MPEG for HTTP-based adaptive streaming media transmission, where MPEG is short for Moving Picture Experts Group), HTTP Live Streaming (HLS for short, which is a standard developed by Apple Inc. for HTTP-based adaptive streaming media transmission), etc.

SUMMARY

The present disclosure provides a method and an apparatus for transmitting resources. The technical solutions of the present disclosure are as follows:

According to an aspect of embodiments of the present disclosure, a method for transmitting resources is provided, including: determining a target code rate at a target moment, where the target code rate matches a play status at the target moment; acquiring target address information of a multimedia resource having the target code rate, in response to the target code rate being inconsistent with a current code rate; and sending a frame acquiring request carrying the target address information to a server, where the frame acquiring request is configured for instructing the server to return media frames of the multimedia resource at the target code rate.

According to another aspect of the embodiments of the present disclosure, an apparatus for transmitting resources is provided, including: at least one processor; and at least one memory configured to store instructions executable by the at least one processor, wherein the at least one processor is configured to perform the following operations by executing the instructions: determining a target code rate at a target moment, where the target code rate matches a play status at the target moment; acquiring target address information of a multimedia resource having the target code rate, in response to the target code rate being inconsistent with a current code rate; and sending a frame acquiring request carrying the target address information to a server, where the frame acquiring request is configured for instructing the server to return media frames of the multimedia resource at the target code rate.

According to another aspect of the embodiments of the present disclosure, a non-transitory storage medium is provided, wherein at least one instruction in the storage medium, when executed by at least one processor of a terminal, causes the terminal to perform the following operations: determining a target code rate at a target moment, where the target code rate matches a play status at the target moment; acquiring target address information of a multimedia resource having the target code rate, in response to the target code rate being inconsistent with a current code rate; and sending a frame acquiring request carrying the target address information to a server, where the frame acquiring request is configured for instructing the server to return media frames of the multimedia resource at the target code rate.

DETAILED DESCRIPTION OF THE PREFERRED EMBODIMENT

Figure 1:
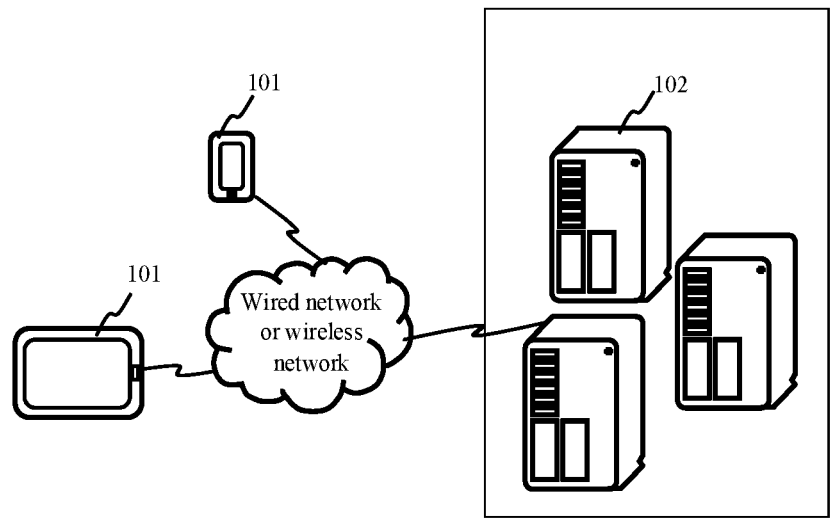
FIG. 1 is a schematic diagram of an implementation environment of a method for transmitting resources according to an embodiment.

The terms "first", "second", and so on in the description and claims of the present disclosure are intended to distinguish between similar objects but do not necessarily indicate a specific order or sequence. It should be understood that the data used in such a way can be exchanged under proper conditions to make it possible to implement the described embodiments of present disclosure in sequences except those illustrated or described herein.

User information involved in the present disclosure includes information authorized by users or fully authorized by various parties.

The terms in the present disclosure are illustrated hereinafter.

I. Flash Video (FLV)

FLV is a streaming media format, which is a video format developed with the introduction of FlashMX (an animation software). An extremely small file size and an extremely fast loading speed make it possible to watch a video file on the network (i.e., to view videos online). The development of FLV effectively solves the problem that an SWF (a dedicated file format for Flash) file, which is exported after Flash is imported to a video file, has a large size and cannot be used on the network desirably.

II. Streaming Media

Streaming media adopts a streaming transmission method, which refers to a technology and process of compressing a sequence of multimedia resources and sending resource packets over the Internet, so as to transmit the multimedia resources in real time on the Internet for viewing. This technology allows resource packets to be sent like running water. Without this technology, the entire media file needs to be downloaded before use, and the multimedia resources can only be watched offline. Streaming can deliver live multimedia resources or multimedia resources pre-stored on a server. When a viewer user watches the multimedia resources, the multimedia resources are played by specific play software after reaching a viewer terminal of the viewer user.

III. FLV Adaptive Streaming (FAS)

FAS is a streaming resource transmission standard (also known as resource transmission protocol) proposed in the present disclosure. For the traditional fragmentation-based media transmission methods such as DASH and HLS, the server divides audio and video resources into audio and video fragments, each of which can be transcoded to have different code rates. When playing the audio and video resources, the terminal accesses URLs of the audio and video fragments divided from the audio and video resources. Different audio and video fragments correspond to same or different code rates, so that the terminal can easily switch between audio and video resources of different code rates. This process is also known as adaptive code rate adjustment based on bandwidth conditions of the terminal itself. In the FAS standard, a terminal sends a frame acquiring request corresponding to a certain play start-up code rate to a server at a play start-up moment; in response to the frame acquiring request, the server transmits media frames of a corresponding multimedia resource to the terminal according to the play start-up code rate. Thereafter, frame-level multimedia transmission is performed between the server and the terminal. Instead of waiting for a complete video segment to arrive before sending resource packets to the terminal, the server can send real-time media frames to the terminal frame by frame. After receiving the media frames, the terminal performs operations such as caching, decoding, and rendering, to play the media frames on the terminal. If code rate switching is required during the play, the terminal only needs send, at the moment when the code rate needs to be switched, a new frame acquiring request corresponding to a particular code rate to be switched. Based on the similar processing logic, the server can transmit media frames of the corresponding multimedia resource to the terminal according to the code rate to be switched, thus realizing dynamic code rate switching. Both the play start-up code rate and the code rate to be switched described above are examples of a target code rate.

In some embodiments, the terminal may specify target position information in the frame acquiring request, to ensure that the media stream is pulled starting from the target position information. Alternatively, the terminal does not specify the target position information in the frame acquiring request, and in this case, the server configures the target position information to be a default value, such that the terminal starts pulling the media stream from the default value of the target position information. In some embodiments, in response to the target position information being less than zero, the server packages all cached media frames starting from the target position information (without fragmentation) and sends the packaged media frames to the server. In some embodiments, in response to the target position information being greater than or equal to zero or the presence of a real-time stream in addition to the cached media frames, the server sends media frames of the multimedia resource cached in real time to the terminal frame by frame.

In some embodiments, the code rate to be switched is determined based on bandwidth information and a media cache volume of the terminal. When the bandwidth information or media cache volume changes, the terminal adaptively adjusts the code rate to be switched and resend a frame acquiring request corresponding to the code rate to be switched.

IV. Live Streaming and On-Demand Streaming

Live streaming: multimedia resources are recorded in real time, and an anchor user "pushes" a media stream (which means pushing a multimedia resource in a streaming manner) to a server through an anchor terminal, and a viewer user triggers, on a viewer terminal, to enter a live streaming interface of the anchor user, and then "pulls" the media stream (which means pulling the multimedia resource in a streaming manner) from the server to the viewer terminal. The viewer terminal decodes and plays the multimedia resource, and thus plays the video in real time.

On-demand streaming: also known as Video On Demand (VOD). Multimedia resources are pre-stored on a server, and according to a requirement of a viewer user, the server can provide a multimedia resource specified by the viewer user. In some embodiments, a viewer terminal sends a VOD request to the server, and the server sends a multimedia resource to the viewer terminal after querying the multimedia resource specified in the VOD request, that is, the viewer user can selectively play a particular multimedia resource.

The play progress of content of VOD can be controlled arbitrarily, but content of live streaming cannot be controlled arbitrarily; the play speed of the live streaming content depends on the real-time live streaming progress of the anchor user.

FIG. 1 is a schematic diagram of an implementation environment of a method for transmitting resources according to an embodiment. Referring to FIG. 1, the implementation environment includes: at least one terminal 101 and a server 102, which are described in detail below.

In some embodiments, the terminal 101 is configured to transmit multimedia resources. A media codec component and a media play component are installed on each terminal. The media codec component is configured to decode a multimedia resource after receiving the multimedia resource (e.g., resource packets transmitted in fragments, or media frames transmitted at a frame level), and the media play component is configured to play the multimedia resource after the multimedia resource is decoded.

According to different user identities, the terminals 101 are classified into an anchor terminal and a viewer terminal. The anchor terminal corresponds to an anchor user and the viewer terminal corresponds to a viewer user. In some embodiments, one terminal may be not only an anchor terminal but also may be a viewer terminal. For example, the terminal is an anchor terminal when the user is recording a live stream, and is a viewer terminal when the user is watching a live stream.

The terminal 101 and the server 102 are connected via a wired network or a wireless network.

In some embodiments, the server 102 is configured to provide a multimedia resource to be transmitted. The server 102 includes at least one of the following: a server, a plurality of servers, a cloud computing platform, or a virtualization center. In some embodiments, the server 102 undertakes primary computing and the terminal 101 undertakes secondary computing; or the server 102 undertakes secondary computing and the terminal 101 undertakes primary computing; or a distributed computing architecture is used between the terminal 101 and the server 102 to perform collaborative computing.

In some embodiments, the server 102 is a cluster Content Delivery Network (CDN) server, and the CDN server includes a central platform and edge servers deployed at different locations. Through load balancing, content distribution, dispatching and other functional modules of the central platform, a terminal where the user is located can acquire required content (i.e., multimedia resource) nearby relying on a local edge server.

The CDN server adds a caching mechanism between the terminal and the central platform. The caching mechanism refers to edge servers (such as WEB servers) deployed at different geographical locations. In performance optimization, the central platform will dispatch an edge server nearest to the terminal to serve the terminal according to distances between the terminal and the edge servers.

The multimedia resource in embodiments of the present disclosure includes, but is not limited to, at least one of the following: video resource, audio resource, image resource, or text resource, which is not limited in embodiments of the present disclosure. For example, the multimedia resource is a live video stream of a network anchor, or a historical on-demand video pre-stored on a server, or a live audio stream of a radio anchor, or a historical on-demand audio pre-stored on a server.

In some embodiments, the device type of the terminal 101 includes, but is not limited to, at least one of the following: a television, a smartphone, a smart speaker, a vehicle terminal, a tablet computer, an e-book reader, a Moving Picture Experts Group Audio Layer III (MP3) player, a Moving Picture Experts Group Audio Layer IV (MP4) player, a laptop computer, or a desktop computer. In the following embodiments, the terminal 101 including a smartphone is used as an example for description.

A person skilled in the art can understand that there may be only one terminal 101, or there may be tens of or hundreds of terminals 101, or more. The number and the device types of the terminals 101 are not limited in embodiments of the present disclosure.

Figure 2:
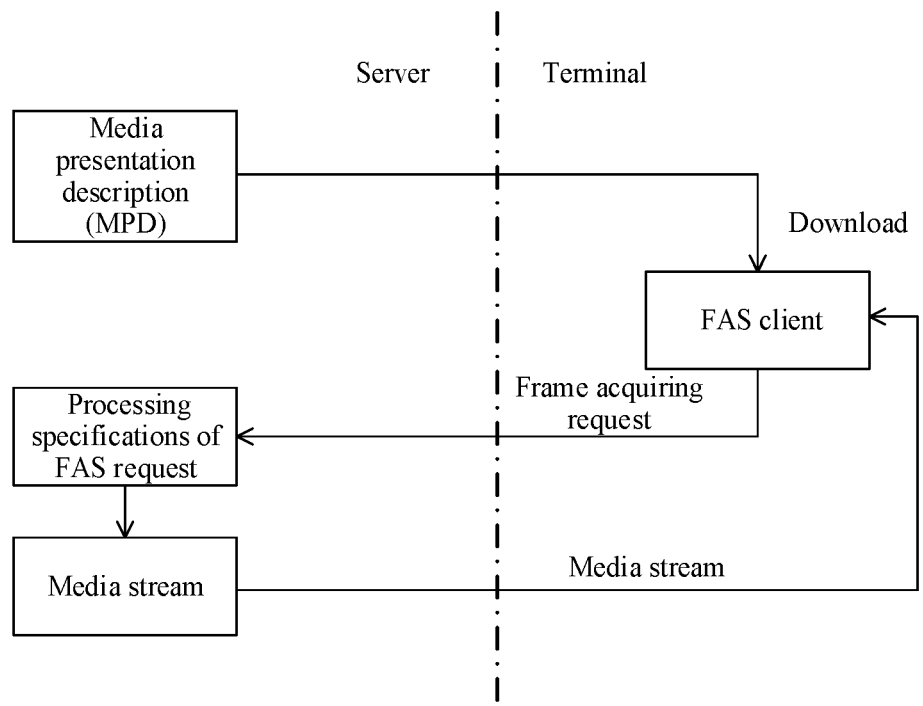
FIG. 2 is a principle schematic diagram of an FLV Adaptive Streaming (FAS) framework according to an embodiment of the present disclosure.

FIG. 2 is a schematic diagram of a FAS framework according to an embodiment of the present disclosure. As shown in FIG. 2, embodiments of the present disclosure provide a FAS (streaming-based multi-bit-rate adaptive) framework, in which multimedia resources are transmitted between the terminal 101 and the server 102 based on a FAS protocol.

Any one of the terminals is used as an example for description. An application (also known as a FAS client) is installed on the terminal. The application is used for browsing multimedia resources. For example, the application is a short video application, a live streaming application, a video-on-demand application, a social application, a shopping application, etc. The type of the application is not limited in embodiments of the present disclosure.

A user starts the application on the terminal. A resource push interface (e.g., a home page or a functional interface of the application) is displayed. The resource push interface includes thumbnail information of at least one multimedia resource. The thumbnail information includes at least one of the following: a title, an introduction, a publisher, a poster, a trailer, or a highlight clip. In response to the user's touch operation on the thumbnail information of any multimedia resource, the terminal redirects from the resource push interface to a resource play interface. The resource play interface includes a play option for the multimedia resource. In response to the user's touch operation on the play option, the terminal downloads a media presentation description (MPD) of the multimedia resource from the server.

Further, based on the media presentation description, the terminal determines target address information of the multimedia resource having a play start-up code rate (or a default play code rate, which refers to a target code rate at a play start-up moment), and sends a frame acquiring request (or known as a FAS request) corresponding to the play start-up code rate (or the default play code rate) to the server, such that the server processes the frame acquiring request based on certain specifications (processing specifications of the FAS request). After locating media frames of the multimedia resource (consecutive media frames can form a media stream), the server returns the media frames of the multimedia resource to the terminal at the play start-up code rate (or the default play code rate) (i.e., the server returns the media stream to the terminal at the target code rate). After receiving the media stream, the terminal invokes the media codec component to decode the media stream to obtain a decoded media stream, and invokes the media play component to play the decoded media stream.

In some embodiments, multimedia resources with a plurality of code rates may be formed after the server transcodes the multimedia resource. In this case, the server assigns different address information to the multimedia resources with different code rates and records the address information of the multimedia resources with various code rates into the MPD. After downloading the MPD, the terminal sends frame acquiring requests carrying different address information to the server at different moments, and then the server will return media frames of the corresponding multimedia resources at different code rates.

Further, a mechanism for adaptive code rate adjustment is provided. As the current bandwidth information or media cache volume of the terminal fluctuates, a play status of the multimedia resource on the terminal changes accordingly. The terminal adaptively adjusts a to-be-switched code rate that best matches the current play status (i.e., the target code rate in the play process). In some embodiments, the FAS standard provides target position information in the frame acquiring request. Different target position information can specify different initial pulling positions of the multimedia resource. Then, after the target position information (if defaulted, the server configures a default value) and the code rate are specified in the frame acquiring request, if the code rate needs to be switched during play, the terminal simply sends a new frame acquiring request and the server can send, starting from the target position information, the media stream to the terminal at another code rate. That is, the terminal can dynamically start pulling the media stream with another code rate from any starting media frame.

In some embodiments, when the code rate needs to be switched, the terminal disconnects the media streaming link at the current code rate and send, to the server, a frame acquiring request carrying the target address information corresponding to the code rate to be switched, and establishes a media streaming link based on the code rate to be switched. Alternatively, the terminal directly re-initiates a frame acquiring request carrying the target address information corresponding to the code rate to be switched without disconnecting the media streaming link of the current code rate, establishes a media streaming link based on the code rate to be switched (for transmission of a new media stream), and uses the original media stream as a standby stream. Once the transmission of the new media stream is abnormal, the terminal continues to play the standby stream.

In the following, the MPD file involved in the foregoing FAS framework will be described.

In some embodiments, the MPD file includes a version number (@version) and a media description set (@adaptationSet); in some other embodiments, the MPD file also includes at least one of the following: a service type (@type), a function option indicating whether to turn on an adaptation function (@hideAuto) or a function option indicating whether to turn on an adaptation function by default at the play start-up moment (@autoDefaultSelect). The content in the MPD file is not specifically limited in embodiments of the present disclosure.

The version number includes at least one of the following: a version number of the media presentation description or a version number of a resource transmission standard (FAS standard).

The media description set is used to represent meta-information about multimedia resources. The media description set includes multiple pieces of media description meta-information. Each piece of media description meta-information corresponds to a multimedia resource with one code rate, and may include a length of a group of pictures (GOP) (@gopDuration) and attribute information (@representation) of the multimedia resource with the code rate corresponding to the media description meta-information.

The GOP length is a distance between two keyframes. A keyframe is an intra-coded picture (also known as "I-frame") in a video coding sequence. The coding and decoding of the I-frame do not need to refer to other image frames and can be implemented using only information of the I-frame itself. The coding and decoding of a predictive-coded picture (P-frame) and a bidirectionally predicted picture (B-frame) need to refer to other image frames, and cannot be implemented using only information of the frame itself.

The attribute information includes identification information of the multimedia resource (@id, a unique identifier), an encoding mode of the multimedia resource (@codec, a codec standard to be followed), a code rate supported by the multimedia resource (@bitrate, data bits transmitted per unit time during resource transmission), and address information of the multimedia resource with the code rate (@url, a URL or domain name provided by a multimedia resource with a certain code rate, wherein the URL is short for Uniform Resource Locater). In some embodiments, the attribute information also includes at least one of the following: a quality type of the multimedia resource (@qualityType, including resolution, frame rate and other quality evaluation indicators), a hidden option of the multimedia resource (@hidden, for indicating whether a multimedia resource with a certain code rate is presented, that is, whether the user can manually select the multimedia resource with this code rate), a function option for indicating whether the multimedia resource is visible relative to an adaptation function (@enableAdaptive, which means whether the adaptation function can select a multimedia resource with a certain code rate) or a default play option (@defaultSelect, which means whether a multimedia resource of a certain code rate is played by default at the start-up of the play).

The service type is used for specifying a service type of the multimedia resource, including at least one of live streaming or on-demand streaming.

In some embodiments, the MPD file is in the format of JavaScript Object Notation (JSON) or in other script formats. The format of the MPD file is not specifically limited in embodiments of the present disclosure.

Figure 3:
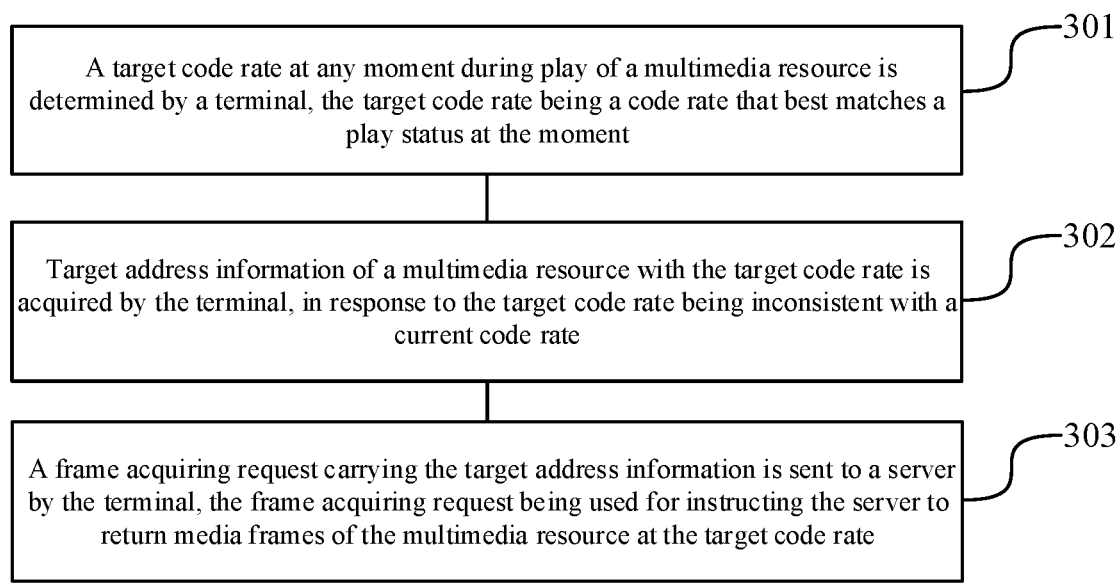
FIG. 3 is a flowchart of a method for transmitting resources according to an embodiment.

FIG. 3 is a flowchart of a method for transmitting resources according to an embodiment. The method for transmitting resources is performed by a terminal in the FAS framework in the implementation environment described above, and is described in detail below.

In 301, a terminal determines a target code rate at any moment during play of a multimedia resource, wherein the target code rate is a code rate that best matches a play status at the moment.

In other words, in 301, the terminal determines a target code rate at a target moment, where the target code rate matches a play status at the target moment; for example, the target code rate is a code rate that best matches the play status at the target moment.

In 302, the terminal acquires target address information of a multimedia resource with the target code rate, in response to the target code rate being inconsistent with a current code rate.

In other words, in 302, the terminal acquires the target address information of the multimedia resource having the target code rate, in response to the target code rate being inconsistent with the current code rate.

In 303, the terminal sends a frame acquiring request carrying the target address information to a server, wherein the frame acquiring request is configured to instruct the server to return media frames of the multimedia resource at the target code rate.

In some embodiments, the target moment is a play start-up moment of the multimedia resource; or the target moment is a download completion moment of any group of pictures in the multimedia resource; or the target moment is a play moment of any media frame in the multimedia resource.

In some embodiments, determining the target code rate at the target moment includes: determining the target code rate based on bandwidth information at the target moment and a media cache volume at the target moment.

In some embodiments, determining the target code rate based on the bandwidth information at the target moment and the media cache volume at the target moment includes: determining an estimated cache volume of at least one candidate code rate based on the bandwidth information and the media cache volume, wherein the estimated cache volume indicates a media cache volume expected to continue downloading a current group of pictures at a corresponding code rate from the target moment to an end of downloading; and determining the target code rate from the at least one candidate code rate or the current code rate based on the estimated cache volume of the at least one candidate code rate.

In some embodiments, determining the target code rate at the target moment includes: determining a play start-up code rate specified by a play business or a default play code rate of a media presentation description as the target code rate in response to the target moment being the play start-up moment of the multimedia resource.

In some embodiments, the method further includes: determining target position information in response to the target code rate being inconsistent with the current code rate, wherein the target position information indicates an initial pulling position for media frames of the multimedia resource; and inserting the target position information into the frame acquiring request carrying the target address information.

In some embodiments, determining the target position information based on the target moment being the play start-up moment of the multimedia resource includes: determining the target position information based on a cache duration specified by a play business.

In some embodiments, determining the target position information based on the target moment being the download completion moment of any group of pictures in the multimedia resource includes: determining a timestamp of a first frame in a next group of pictures of the group of pictures as the target position information.

In some embodiments, determining the target position information based on the target moment being the play moment of any media frame in the multimedia resource includes: determining a timestamp of a first frame in a currently downloaded group of pictures as the target position information.

In some embodiments, the method further includes: ignoring the target code rate in response to the target code rate being consistent with the current code rate, and continuously transmitting the multimedia resource at the current code rate.

In some embodiments, the method further includes: playing a media frame with a highest code rate among the plurality of code rates in a process of playing the multimedia resource based on presence of same media frames with a plurality of code rates in a cache.

Figure 4:
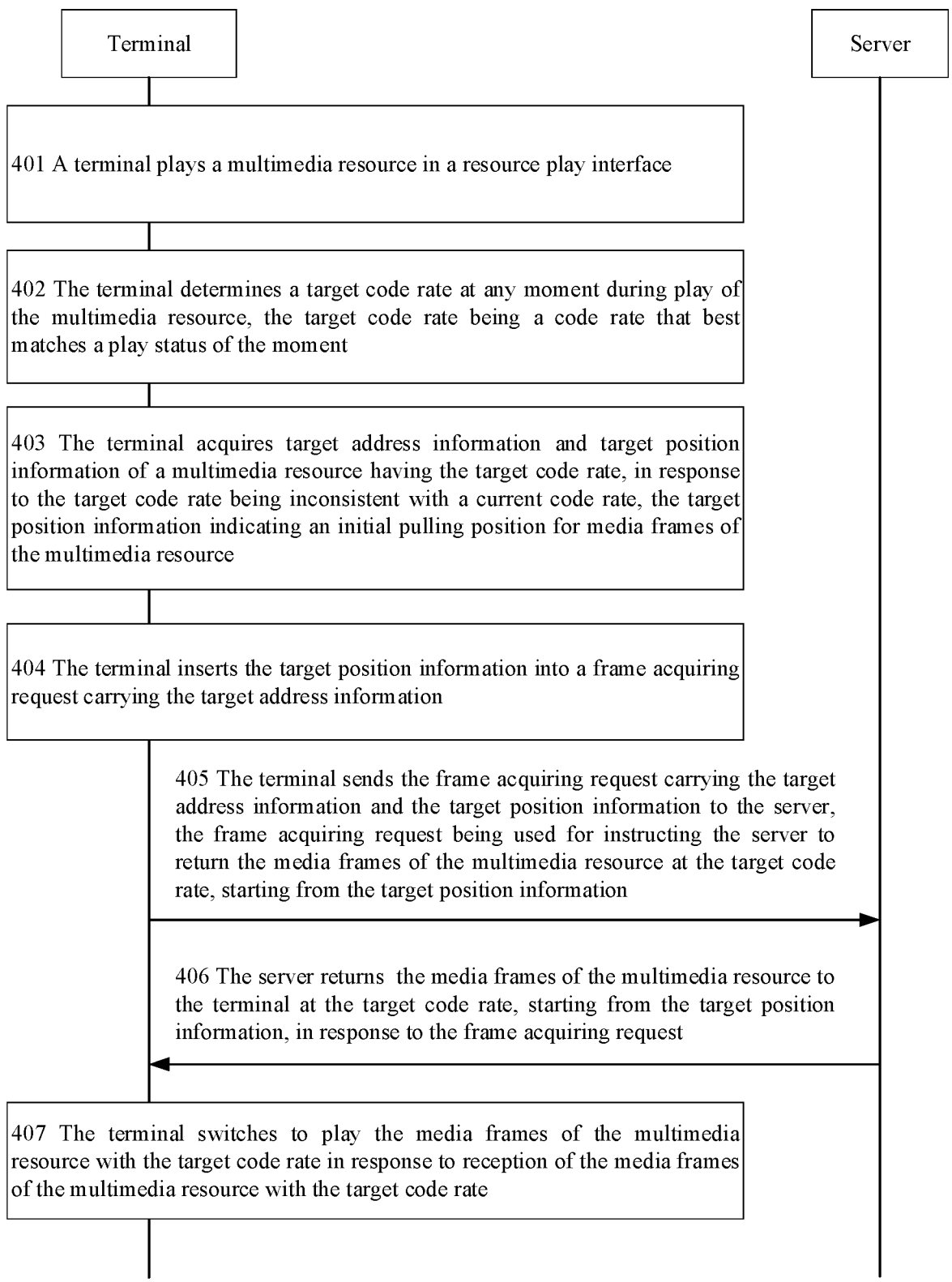
FIG. 4 is an interaction flowchart of a method for transmitting resources according to an embodiment.

FIG. 4 is an interaction flowchart of a method for transmitting resources according to an embodiment. The method for transmitting resources is applied to the FAS framework in the implementation environment described above. This embodiment includes the following content.

In 401, a terminal plays a multimedia resource in a resource play interface.

An application is installed on the terminal. The application is used for browsing multimedia resources. For example, the application includes at least one of the following: a short video application, a live streaming application, a video-on-demand application, a social application, a shopping application, etc. The type of the application is not specifically limited in embodiments of the present disclosure.

The multimedia resource in embodiments of the present disclosure includes, but is not limited to, at least one of the following: video resource, audio resource, image resource, or text resource. The type of the multimedia resource is not specifically limited in embodiments of the present disclosure. For example, the multimedia resource is a live video stream of a network anchor, or a historical on-demand video pre-stored on a server, or a live audio stream of a radio anchor, or a historical on-demand audio pre-stored on a server.

In some embodiments, a user starts the application on the terminal to display a resource push interface. For example, the resource push interface is a home page or a functional interface of the application. The type of the resource push interface is not specifically limited in embodiments of the present disclosure. The resource push interface includes thumbnail information of at least one multimedia resource, which includes at least one of the following: a title, an introduction, a poster, a trailer, or a highlight clip of the multimedia resource. In the process of browsing the resource push interface, the user clicks on the thumbnail information of a multimedia resource of interest. In response to the user's touch operation on the thumbnail information of the multimedia resource, the terminal redirects from the resource push interface to a resource play interface.

The resource play interface includes a play area and a comment area. The play area displays a play option for the multimedia resource, and the comment area displays viewing comments made by other users on the multimedia resource.

In some embodiments, the play area also displays detail information of the multimedia resource. The detail information includes at least one of the following: a title, an introduction, keywords, publisher information, or current popularity of the multimedia resource. The publisher information includes a nickname, an avatar, and followers, and so on of the publisher. The content of the detail information or the publisher information is not specifically limited in embodiments of the present disclosure.

In some embodiments, the play area also displays a bullet comments input area and a bullet comments setting option. Through the bullet comments setting option, the user controls at least one of the following: whether to display the bullet comments, a movement speed, a display area or a display mode (such as transparency and font size) of the bullet comments. The user also inputs comment content by clicking on the bullet comments input area, and sends the inputted content, such that the inputted content is displayed in the play area of the multimedia resource in the form of bullet comments. The form of the bullet comments is not limited to text or emoticon images. The content of the bullet comments setting option or the form of the bullet comments are not specifically limited in embodiments of the present disclosure.

In some embodiments, the play area also displays a favorite option and a follow option. By clicking on the favorite option, the user triggers the terminal to send a favorite request to the server. In response to the favorite request, the server adds the multimedia resource to corresponding favorites of the user. By clicking on the follow option, the user triggers the terminal to send a follow request to the server. In response to the follow request, the server adds the publisher of the multimedia resource to a follow list corresponding to the user.

In some embodiments, the play area also displays a gift option for virtual gifts. After the user clicks on the gift option, a selection bar for categories of virtual gifts and a gift quantity is displayed. After selecting a category and a quantity of virtual gifts, the user triggers the terminal to send a virtual gift giving request to the server by clicking on a confirmation button. The server settles the virtual gift giving request by deducting a certain value from the user's account and issuing a certain value to the anchor's account. After the settlement is completed, the terminal displays a special effect animation of the virtual gift in a floating manner in the play area.

The various possible implementations described above provide different layouts of the resource play interface, and the resource play interface has more or fewer layout manners in practical application. The layout manner of the resource play interface is not specifically limited in embodiments of the present disclosure.

After the resource play interface is displayed, when the user wants to watch a multimedia resource, the user clicks on the play option in the play area. In response to the user's touch operation on the play option, at the play start-up moment (meaning the beginning of play) in the play process, the terminal acquires a media stream of a multimedia resource at a certain code rate, invokes the media codec component to decode the media stream, and invokes the media play component to play the decoded media stream through operations in 402 to 407 below.

In some embodiments, at any play moment other than the play start-up moment in the play process, the terminal can still acquire a media stream of a multimedia resource with another code rate (a new media stream) again through the operations in 402 to 407 below, so as to switch from the original media stream to the new media stream and realize seamless switching between multiple code rates. Whether 402 to 407 are executed at the play start-up moment or at any play moment in the play process is not specifically limited in embodiments of the present disclosure.

In 402, the terminal determines a target code rate at any moment during play of the multimedia resource, wherein the target code rate is a code rate that best matches a play status of the moment.

In other words, in 402, the terminal determines a target code rate at a target moment, wherein the target code rate matches a play status at the target moment; for example, the target code rate is a code rate that best matches the play status at the target moment.

In some embodiments, the target moment is a play start-up moment of the multimedia resource; or the target moment is a download completion moment of any group of pictures (GOP) in the multimedia resource; or the target moment is a play moment of any media frame in the multimedia resource. The target moment may be any moment in the play process, which is not specifically limited in embodiments of the present disclosure.

In some embodiments, the terminal further provides a code rate selection list to the user. The user clicks on any value in the code rate selection list to trigger generation of a code rate selection instruction carrying the value. In response to the code rate selection instruction, the terminal determines the value carried by the code rate selection instruction as the target code rate.

In some embodiments, the play business itself may specify a play start-up code rate in the case that the target moment is the play start-up moment of the multimedia resource, or there may be a default play code rate in the MPD of the multimedia resource. Therefore, the terminal determines the play start-up code rate specified by the play business or the default play code rate of the media presentation description as the target code rate.

The default play code rate is a code rate of a multimedia resource for which the @defaultSelect field in the media description meta-information of the MPD file is set to true. Since the media play component cannot play multimedia resources at two code rates by default (there is a play conflict), in the whole media description meta-information, the @defaultSelect field is true for the multimedia resource with at most one code rate.

In some embodiments, the terminal traverses the media description meta-information of the MPD. If there is only one multimedia resource of which the @defaultSelect field is true, the terminal determines the @bitrate field of the multimedia resource as the target code rate. If there is not only one multimedia resource of which the @defaultSelect field is true (e.g., there are at least two multimedia resources of which the @defaultSelect field is true, or there is no multimedia resource of which the @defaultSelect field is true), the terminal determines whether the play business specifies a play start-up code rate. If the play business specifies a play code rate, the specified play start-up code rate is determined as the target code rate. If the play business does not specify a play start-up code rate, the terminal automatically determines the target code rate based on the bandwidth information and the media cache volume according to the following adaptive policy.

In some embodiments, the terminal adjusts the target code rate based on the following adaptive policy. The terminal determines the target code rate based on the bandwidth information at the target moment and the media cache volume at the target moment. In some embodiments, the bandwidth information is sampled by the terminal at a first sampling interval, and the media cache volume is sampled by the terminal at a second sampling interval. The first sampling interval and the second sampling interval are the same or different. For example, the first sampling interval and the second sampling interval are triggered by the same timer to perform respective sampling logic.

The bandwidth information refers to a transmission rate of the multimedia resource. Assuming that each sampling duration of the bandwidth information is T (in the unit of milliseconds, i.e., ms) and the amount of data downloaded by the terminal during the sampling duration is S (in the unit of bytes), one bandwidth sampling point B is expressed as $B=S*8/T$, wherein B is in the unit of kilobytes per second (kbps), $T>0$, for example, $T=500$ ms, and $S \geq 0$, which depends on the actual download amount of the terminal.

The media cache volume refers to the amount of data of all media frames belonging to the multimedia resource in the cache.

In some embodiments, the terminal determines an estimated cache volume of at least one candidate code rate based on the bandwidth information and the media cache volume, wherein the estimated cache volume indicates a media cache volume expected to continue downloading a current group of pictures at a corresponding code rate from the target moment to the end of downloading (that is, the estimated cache volume at the end of downloading after continuing to download the current group of pictures at the corresponding code rate from the target moment); and the terminal determines the target code rate from the at least one candidate code rate or the current code rate based on the estimated cache volume of the at least one candidate code rate.

In some embodiments, the terminal configures two thresholds for the media cache volume, including a first threshold and a second threshold respectively, wherein the first threshold is greater than the second threshold, that is, the first threshold is a higher threshold. If the media cache volume is greater than the first threshold, it indicates that the media cache volume is sufficient, and an attempt can be made to increase the code rate of the multimedia resource. Therefore, at least one code rate, which is greater than the current code rate, in a code rate set supported by the multimedia resource can be determined as the at least one candidate code rate. The second threshold value is a lower threshold value. If the media cache volume is less than the second threshold, it indicates that the media cache volume is scarce, and the code rate of the multimedia resource needs to be reduced appropriately. Therefore, all the code rates in the code rate set supported by the multimedia resource can be determined as the at least one candidate code rate.

The case where the media cache volume is greater than the first threshold and the case where the media cache volume is less than the second threshold are discussed below, respectively.

1) In the case where the media cache volume is greater than the first threshold, as can be learned from the above analysis, at least one code rate, which is greater than the current code rate, in the code rate set is determined as the at least one candidate code rate, and for any candidate code rate, an estimated cache volume of the candidate code rate is calculated. The estimated cache volume of the candidate code rate can be expressed as follows:

$$q=q_c+D-d-D*r*8/B^{est}$$

In the above equation, q is an estimated cache volume, $q_c$ is a media cache volume at the current moment (current cache volume), D is a GOP length (in the unit of ms), d is a length for which downloading has been finished in the current GOP (in the unit of ms), r is any predicted code rate, and $B^{est}$ is bandwidth information at the current moment.

Assuming that the first threshold is $q_h$, and the current code rate is $r_c$, after the terminal calculates the estimated cache volume q for each candidate code rate r ($r>r_c$), if there is no multimedia resource with an estimated cache volume greater than the first threshold ($q>q_h$), the terminal determines the current code rate $r_c$ as the target code rate; otherwise, if there is one or more multimedia resources with an estimated cache volume greater than the first threshold ($q>q_h$), the terminal determines the largest candidate code rate among the candidate code rates satisfying $q>q_h$ as the target code rate.

(2) In the case where the media cache volume is less than the second threshold, as can be learned from the above analysis, all the code rates in the code rate set are determined as the at least one candidate code rate. For any candidate code rate, an estimated cache volume of the candidate code rate is acquired according to an operation similar to that in example 1) described above, and details are not described herein again.

Assuming that the second threshold is $q_l$ ($q_l<q_h$), after the terminal calculates the estimated cache volume q for each candidate code rate r, if there is one or more multimedia resources with an estimated cache volume greater than or equal to the second threshold ($q≥q_l$), the terminal determines the largest candidate code rate among the candidate code rates satisfying $q≥q_l$ as the target code rate; otherwise, if there is no multimedia resource with an estimated cache volume greater than or equal to the second threshold ($q≥q_l$), the terminal further needs to calculate a reference cache volume. The reference cache volume refers to an estimated cache volume expected to continue downloading at the current code rate until the current GOP is downloaded. The reference cache volume for the current code rate is expressed as follows:

$$q=q_c+D-d-(D-d)*r_c*8/B^{est}$$

wherein $r_c$ denotes the current code rate, and q, $q_c$, D, d, and $B^{est}$ each have the same meaning as the same reference numeral in the previous equation. Details are not described herein again.

After the reference cache volume is calculated, a code rate r* corresponding to the largest cache volume among the estimated cache volumes and the reference cache volume is determined as the target code rate. In particular, if r*=$r_c$, the current code rate is determined as the target code rate. The target code rater is not equal to the current code rate $r_c$ in the rest cases.

The above process provides a mechanism for determining the target code rate based on the bandwidth information and the media cache volume, i.e., an adaptive adjustment policy for the target code rate. It should be noted that the moment described above is any one of the following: a play start-up moment, a download completion moment of any GOP or a play moment of any media frame. Thus, in some embodiments, if the play business does not specify a play start-up code rate at the play start-up moment and no default play code rate is specified in the MPD, the terminal invokes the adaptive adjustment policy to determine the target code rate at the play start-up moment. Alternatively, at the end of downloading of each GOP, the terminal invokes an adaptive policy to determine the target code rate for downloading the next GOP. This policy is also called a "GOP boundary decision". Alternatively, at the play moment of any media frame, the terminal invokes an adaptive policy to determine the target code rate for the next moment, and this policy is also referred to as an "arbitrary point decision".

In some embodiments, in addition to determining the target code rate based on the bandwidth information and the media cache volume, the terminal can also determine the target code rate based on the bandwidth information and play status information. The play status information includes at least one of the following: a video cache volume, an audio cache volume, last jam time, last jam duration, or a frame loss rate within a sampling duration. The content included in the play status information is not specifically limited in embodiments of the present disclosure. The video cache volume and the audio cache volume are collectively referred to as the "media cache volume" above.

In 403, the terminal acquires target address information and target position information of a multimedia resource having the target code rate, in response to the target code rate being inconsistent with a current code rate, wherein the target position information indicates an initial pulling position for media frames of the multimedia resource.

In some embodiments, in response to the target code rate being inconsistent with the current code rate, it is necessary to perform code rate switching. By using the target code rate as an index, the terminal queries the MPD to obtain media description meta-information corresponding to the multimedia resource having the target code rate, and extract the target address information stored in the @url field from the media description meta-information.

In some embodiments, the target position information (@fasSpts) is configured to indicate a specific frame from which the server starts transmitting the media stream. A data type of the target position information may be int64_t, or may be other data types. The data type of the target position information is not specifically limited in embodiments of the present disclosure.

It should be noted that the target position information represents a position parameter relative to the current moment. If the target position information is less than 0, the terminal will pull cached data within a historical period of time. If the target position information is equal to 0, the terminal will start pulling a real-time media stream at the current moment. If the target position information is greater than 0, the terminal will start pulling a real-time media stream at a future moment.

The following discusses how to acquire the target position information for different execution moments.

1) In the case that the target moment is the play start-up moment of the multimedia resource, the terminal determines the target position information based on a cache duration specified by a play business.

The cache duration specified by the play business is determined by a service provider according to service requirements. For example, for some short videos, the cache duration is set to 8 seconds (or other values, which is customized by a service provider), while for some long videos, the cache duration is set to 1 minute (or other values, which is customized by a service provider). The value of the cache duration is not specifically limited in embodiments of the present disclosure.

In some embodiments, in the case of determining the target position information based on the cache duration, the terminal maps the cache duration to the corresponding target position information. For example, if the cache duration is 8 seconds, the 8-second cache duration is mapped as follows: @fasSpts=−8000. At this point, the target position information is a negative value, which means cached data within a historical period of time is pulled, and the terminal has at most 8 seconds of cached data in the cache.

In some embodiments, instead of specifying the cache duration, the play business can specify the target position information directly. The target position information specified by the service provider is denoted by "fasSptsInit". Whether the service provider specifies the cache duration or the target position information is not specifically limited in embodiments of the present disclosure.

(2) In the case that the target moment is the download completion moment of any group of pictures (GOP) of the multimedia resource, the terminal determines a timestamp of a first frame of a next group of pictures of the group of pictures as the target position information.

In some embodiments, each time downloading of one GOP is finished, the terminal invokes the adaptive policy of GOP boundary decision to determine the target code rate of the next GOP, and after determining the target code rate, the terminal determines a presentation time stamp (PTS) of the first frame in the next GOP as the target position information. In some embodiments, if the cache includes a video resource, the first frame refers to the first I-frame in the video resource; and if the cache does not include any video resource, the first frame refers to the first audio frame in an audio resource.

(3) In the case that the target moment is the play moment of any media frame in the multimedia resource, the terminal determines a timestamp of a first frame in a currently downloaded group of pictures as the target position information.

In some embodiments, the terminal invokes the adaptive policy of arbitrary point decision to determine the target code rate at any play moment. If the code rates of the I-frame and P-frame (or B-frame) are different within the same GOP, it is impossible to perform decoding. Therefore, the code rate switching can only be performed between GOPs, but not within one GOP. It cannot guarantee that an arbitrary play moment is exactly at a download completion moment of a GOP. Therefore, after determining the target code rate, the terminal needs to pull the entire current GOP once again, and thus determines the PTS of the first frame in the currently downloaded GOP as the target position information. In some embodiments, if the cache includes a video resource, the first frame is the first I-frame in the video resource; and if the cache does not include any video resource, the first frame is the first audio frame in an audio resource.

The above examples 2) and 3) are both scenarios of code rate switching in a play process, but not the play start-up scenario in example 1). The target address information determined in the code rate switching scenario is denoted by "urlSwitch" and the determined target position information is denoted by "fasSptsSwitch".

In 403 above, the processing logic of how the terminal determines the target address information and the target position information in a case that the target code rate is inconsistent with the current code rate is described. In some embodiments, in response to the target code rate being consistent with the current code rate, the terminal ignores the target code rate and continuously transmits the multimedia resource at the current code rate. In this case, the code rate remains the same, and the address information for stream pulling remains the same. The terminal does not need to generate new frame acquiring requests or send redundant frame acquiring requests, and can directly continue media streaming at the current code rate in accordance with the FAS standard.

In 404, the terminal inserts the target position information into a frame acquiring request carrying the target address information.

In some embodiments, the frame acquiring request includes an address information field (@url) and an extended field. The terminal writes the target address information into the address information field of the frame acquiring request and writes the target position information into the extended field of the frame acquiring request.

In some embodiments, a viewer user enters a live streaming room (live streaming interface, which is a type of resource play interface) of a particular anchor user in the application. During an initialization phase of play, the terminal needs to pull a certain amount of cached media stream to start the play. At the start-up of the play, the terminal obtains target address information (@url) corresponding to a media stream to be requested according to an initial media stream specified by the service (media stream with the play start-up code rate) or a default initial media stream in the MPD (media stream with the default play code rate). In this case, the target address information at the play start-up moment is denoted by "urlStart". Assuming that the service also specifies a negative value as the target position information (@fasSpts=fasSptsInit<0), the target address information at the play start-up moment and the target position information are encapsulated in a frame acquiring request. In this case, the frame acquiring request (FAS request at the start-up of the play) is expressed as "urlStart&(fasSpts=fasSptsInit)".

In some embodiments, while the user is watching the multimedia resource, the target code rate outputted by the adaptive policy may become inconsistent with the current code rate as the bandwidth information and play status information change, indicating that the current code rate does not match with the current bandwidth information and play status information. In this case, the terminal needs to perform code rate switching, that is, switch the current code rate to the target code rate. In some embodiments, the target address information of the code rate switching process is denoted by "urlSwitch", and the target position information of the code rate switching process is denoted by "fasSptsSwitch". The target address information and target position information of the code rate switching process are encapsulated in a frame acquiring request. In this case, the frame acquiring request (FAS request during code rate switching) can be expressed as "urlSwitch&(fasSpts=fasSptsSwitch)".

In 405, the terminal sends the frame acquiring request carrying the target address information and the target position information to a server, wherein the frame acquiring request is configured to instruct the server to return the media frames of the multimedia resource at the target code rate, starting from the target position information.

In the above process, the terminal encapsulates both the target address information and the target position information in the frame acquiring request. In one possible implementation, the terminal may encapsulate only the target address information in the frame acquiring request, i.e., the target position information is defaulted in the frame acquiring request. In this case, a default value of the target position information is configured by the server according to the FAS specifications, so that the media streaming begins from the default value of the target position information.

In some embodiments, the extended field of the frame acquiring request further carries an audio parameter. The audio parameter is configured to indicate whether requested media frames are audio frames. If the audio parameter is set to true, it means that the media frames pulled by the terminal are audio frames, i.e., the terminal only pulls a pure audio stream. Otherwise, if the audio parameter is set to false, it means that media frames pulled by the terminal are audio and video frames, i.e., the terminal pulls both audio and video streams. Without particular specification, "false" can be used as a default value. Certainly, it is also supported to set "true" as the default value, and this is not specifically limited in embodiments of the present disclosure.

In some embodiments, when configuring the audio parameter, the terminal obtains the type of the multimedia resource. If the type of the multimedia resource is video, the audio parameter is set to "false" or a default value. If the type of the multimedia resource is audio, the audio parameter is set to "true".

In some embodiments, when configuring the audio parameter, the terminal further detects the type of the application. If the type of the application is a video application, the audio parameter is set to "false" or a default value. If the type of the application is an audio application, the audio parameter is set to "true".

In some other embodiments, the frame acquiring request does not carry the audio parameter, or does not carry the target position information, or carries neither the audio parameter nor the target position information. The content of the extended field is not specifically limited in embodiments of the present disclosure.

In 406, the server returns the media frames of the multimedia resource to the terminal at the target code rate, starting from the target position information, in response to the frame acquiring request.

In some embodiments, after receiving the frame acquiring request, the server parses the frame acquiring request to obtain the target address information and the target position information. Based on the target address information, the server locates the media frames of the multimedia resource with the target code rate in a resource library and sends the media frames of the multimedia resource to the terminal at the target code rate in ascending order of timestamps (the consecutive media frames form a media stream) starting from the target position information.

In some embodiments, if the frame acquiring request does not carry the target position information, the server configures the target position information to be the default value. The server can determine the target position information by parsing the target position information in the frame acquiring request or configuring the default value as the target position information. Further, based on the target position information, a specific timestamp for starting pulling of the media frames is determined, such that the server can return the media frames in the form indicated by the audio parameter to the terminal at the target code rate, starting from the timestamp indicated by the target position information.

In some embodiments, if the server is a CDN server, the target address information is a domain name. The terminal sends a frame acquiring request to a central platform of the CDN server. The central platform obtains a CNAME (alias) record corresponding to the domain name by invoking a domain name system (DNS, which is essentially a domain name resolution library) to resolve the domain name. By resolving the CNAME record again based on geographic location information of the terminal, an Internet Protocol (IP) address of an edge server nearest to the terminal is obtained. In this case, the central platform directs the frame acquiring request to the obtained edge server. In response to the frame acquiring request, the edge server provides the media frames of the multimedia resources to the terminal at the target code rate, thus enabling the terminal to access the multimedia resource with the target code rate nearby.

In 407, the terminal switches to play the media frames of the multimedia resource with the target code rate in response to reception of the media frames of the multimedia resource with the target code rate.

In some embodiments, if the terminal receives the media frames of the multimedia resource with the target code rate (media frames received consecutively form a media stream), the terminal stores the media frames into the cache, invokes the media codec component to decode the media frames to obtain decoded media frames, and invokes the media play component to play the media frames in the cache in an ascending order of the timestamps (PTS).

In the decoding process, the terminal determines an encoding mode of the multimedia resource from the @codec field of the media presentation description, determines a corresponding decoding mode based on the encoding mode, and thus decodes the media frames based on the determined decoding mode.

In some embodiments, when sending the frame acquiring request corresponding to the code rate to be switched, the terminal supports disconnecting the existing media streaming link, and also supports maintaining the existing media streaming link open. In the case of not disconnecting the existing media streaming link, it is equivalent to establishing two media streaming links. The terminal plays the media stream based on an active/standby stream mode, wherein the original media stream is used as a standby stream and the new media stream is played preferentially. Once the new media stream has a transmission exception, the terminal continues to play the standby stream.

In some embodiments, in the above process of playing the multimedia resource, in response to the existence of same media frames with multiple code rates in the cache, the terminal plays the media frame with the highest code rate among the multiple code rates.

In the above process, such a streaming-based media transmission method can implement frame-level transmission of multimedia resources. Since the frame acquiring request carries the target position information, seamless switching between media streams of different code rates can be achieved, thus achieving adaptation among multiple code rates. If the network condition changes and the code rate needs to be switched, the code rate is switched seamlessly through the FAS framework.

Figure 5:
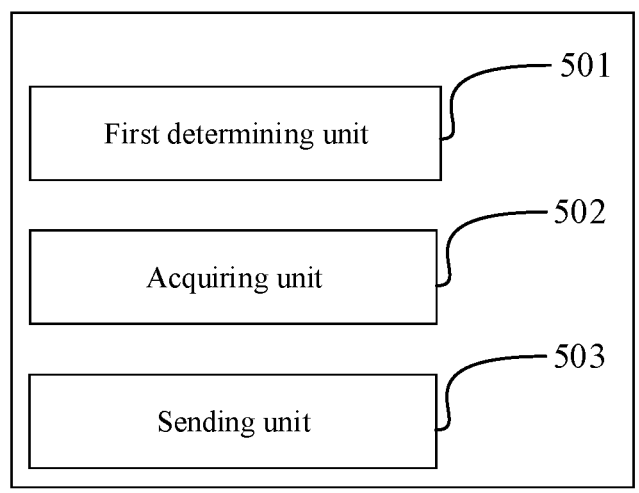
FIG. 5 is a block diagram of a logic structure of a resource transmission apparatus according to an embodiment.

FIG. 5 is a block diagram of a logic structure of a resource transmission apparatus according to an embodiment. Referring to FIG. 5, the apparatus includes a first determining unit 501, an acquiring unit 502, and a sending unit 503.

The first determining unit 501 is configured to determine a target code rate at any moment during play of the multimedia resource, wherein the target code rate is a code rate that best matches a play status at the moment.

In other words, the first determining unit 501 is configured to determine a target code rate at a target moment, wherein the target code rate matches a play status at the target moment; for example, the target code rate is a code rate that best matches the play status at the target moment.

The acquiring unit 502 is configured to acquire target address information of a multimedia resource having the target code rate, in response to the target code rate being inconsistent with a current code rate.

In other words, the acquiring unit 502 is configured to acquire the target address information of the multimedia resource having the target code rate, in response to the target code rate being inconsistent with the current code rate.

The sending unit 503 is configured to send a frame acquiring request carrying the target address information to a server, wherein the frame acquiring request is configured to instruct the server to return media frames of the multimedia resource at the target code rate.

In some embodiments, the target moment is a play start-up moment of the multimedia resource; or the target moment is a download completion moment of any group of pictures in the multimedia resource; or the target moment is a play moment of any media frame in the multimedia resource.

In some embodiments, based on the composition of the apparatus shown in FIG. 5, the first determining unit 501 includes: a determining subunit configured to determine the target code rate based on bandwidth information at the target moment and a media cache volume at the target moment.

In some embodiments, the determining subunit is configured to: determine an estimated cache volume of at least one candidate code rate based on the bandwidth information and the media cache volume, wherein the estimated cache volume indicates a media cache volume expected to continue downloading a current group of pictures at a corresponding code rate from the target moment to the end of downloading; and determine the target code rate from the at least one candidate code rate or the current code rate based on the estimated cache volume of the at least one candidate code rate.

In some embodiments, the first determining unit 501 is configured to: determine a play start-up code rate specified by a play business or a default play code rate of a media presentation description as the target code rate in the case that the target moment is the play start-up moment of the multimedia resource.

In some embodiments, based on the composition of the apparatus shown in FIG. 5, the apparatus further includes: a second determining unit, configured to determine target position information in response to the target code rate being inconsistent with the current code rate, wherein the target position information indicates an initial pulling position for media frames of the multimedia resource; and an inserting unit, configured to insert the target position information into the frame acquiring request carrying the target address information.

In some embodiments, based on the target moment being the play start-up moment of the multimedia resource, the second determining unit is configured to: determine the target position information based on a cache duration specified by a play business.

In some embodiments, based on the target moment being the download completion moment of any group of pictures in the multimedia resource, the second determining unit is configured to: determine a timestamp of a first frame in a next group of pictures of the group of pictures as the target position information.

In some embodiments, based on the target moment being the play moment of any media frame in the multimedia resource, the second determining unit is configured to: determine a timestamp of a first frame in a currently downloaded group of pictures as the target position information.

In some embodiments, based on the composition of the apparatus shown in FIG. 5, the apparatus further includes: a transmitting unit, configured to ignore the target code rate in response to the target code rate being consistent with the current code rate, and continuously transmit the multimedia resource at the current code rate.

In some embodiments, based on the composition of the apparatus shown in FIG. 5, the apparatus further includes: a playing unit, configured to play, in response to the presence of same media frames with a plurality of code rates in a cache, a media frame with a highest code rate among the plurality of code rates in a process of playing the multimedia resource.

Figure 6:
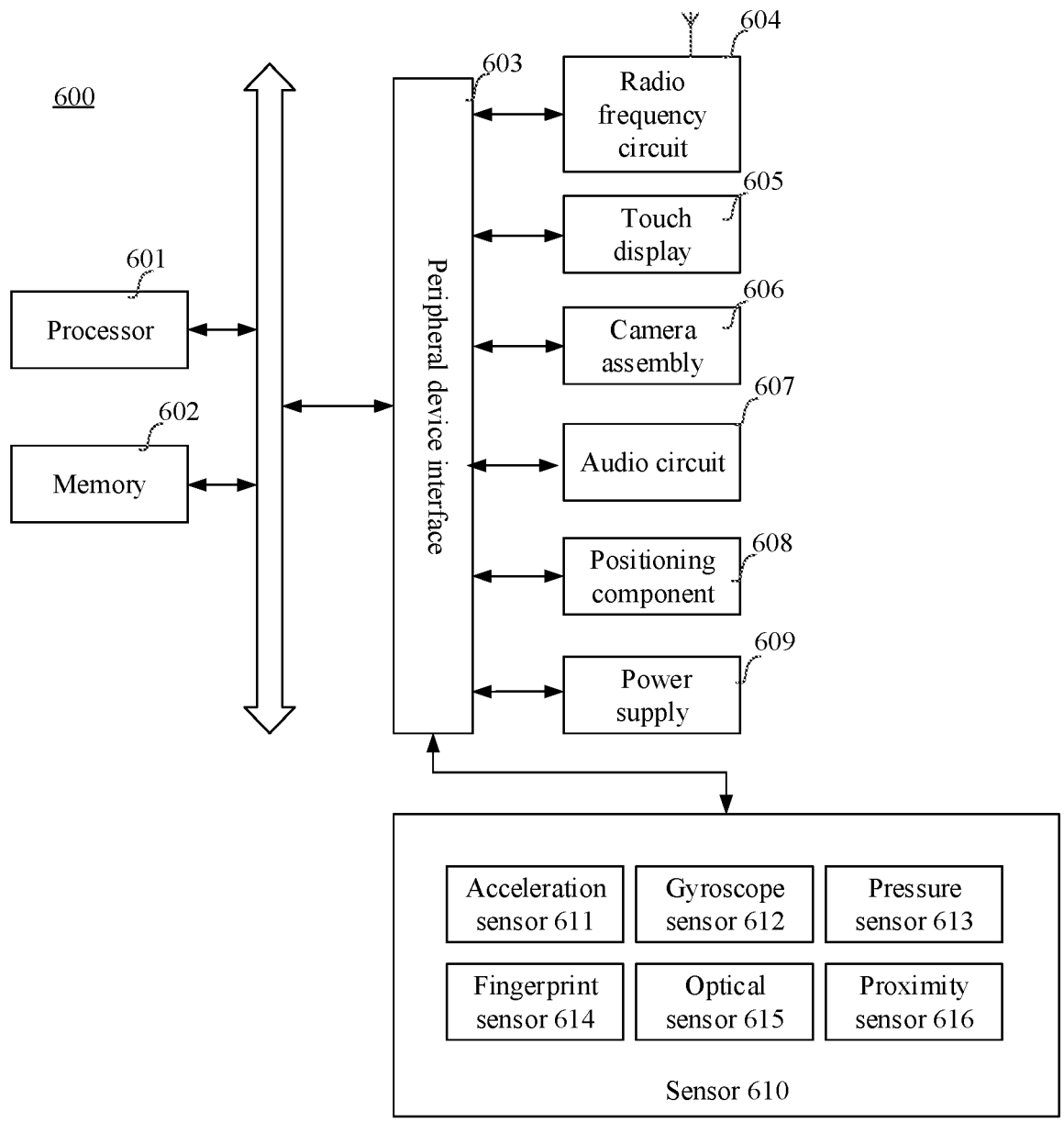
FIG. 6 is a structural block diagram of an apparatus for transmitting resources according to an embodiment of the present disclosure.

FIG. 6 is a structural block diagram of a terminal according to an embodiment of the present disclosure. The terminal 600 may be a smartphone, a tablet computer, a Moving Picture Experts Group Audio Layer III (MP3) player, a Moving Picture Experts Group Audio Layer IV (MP4) player, a laptop computer, or a desktop computer. The terminal 600 may also be referred to as user equipment, a portable terminal, a laptop terminal, a desktop terminal, or the like.

Generally, the terminal 600 includes a processor 601 and a memory 602.

The processor 601 may include one or more processing cores, for example, a 4-core processor or an 8-core processor. The processor 601 may be implemented by using at least one of the following hardware forms: digital signal processing (DSP), a field-programmable gate array (FPGA), and a programmable logic array (PLA). The processor 601 may alternatively include a main processor and a coprocessor. The main processor is configured to process data in an awake state, also referred to as a central processing unit (CPU), and the coprocessor is a low-power processor configured to process data in a standby state. In some embodiments, the processor 601 may be integrated with a graphics processing unit (GPU). The GPU is configured to be responsible for rendering and drawing content that a display needs to display. In some embodiments, the processor 601 may further include an artificial intelligence (AI) processor. The AI processor is configured to process computing operations related to machine learning.

The memory 602 may include one or more computer-readable storage media, which may be non-transient. The memory 602 may further include a high-speed random access memory and a non-volatile memory such as one or more magnetic disk storage devices and a flash storage device. In some embodiments, the non-transitory computer-readable storage medium in the memory 602 is configured to store at least one instruction. The at least one instruction is executed by the processor 601 to implement the method for transmitting resources provided in the embodiments of the present disclosure.

In some embodiments, the terminal 600 may further optionally include a peripheral device interface 603 and at least one peripheral device. The processor 601, the memory 602, and the peripheral device interface 603 may be connected through a bus or a signal cable. Each peripheral device may be connected to the peripheral device interface 603 through a bus, a signal cable, or a circuit board. Specifically, the peripheral device includes at least one of the following: a radio frequency circuit 604, a touch display 605, a camera assembly 606, an audio circuit 607, a positioning component 608, and a power supply 609.

The peripheral device interface 603 may be configured to connect at least one peripheral device related to input/output (I/O) to the processor 601 and the memory 602. In some embodiments, the processor 601, the memory 602, and the peripheral device interface 603 are integrated into the same chip or circuit board; in some other embodiments, any one or two of the processor 601, the memory 602, and the peripheral device interface 603 may be implemented on an independent chip or circuit board. This is not limited in the embodiments of the present disclosure.

The radio frequency circuit 604 is configured to receive and transmit a radio frequency (RF) signal, also referred to as an electromagnetic signal. The radio frequency circuit 604 communicates with a communications network and another communications device by using the electromagnetic signal. The radio frequency circuit 604 may convert an electric signal into an electromagnetic signal for transmission, or convert a received electromagnetic signal into an electric signal. In some embodiments, the radio frequency circuit 604 includes: an antenna system, an RF transceiver, one or more amplifiers, a tuner, an oscillator, a digital signal processor, a codec chip set, a subscriber identity module card, and the like. The radio frequency circuit 604 may communicate with another terminal through at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the radio frequency circuit 604 may further include a near field communication (NFC) related circuit, and is not limited in the embodiments of the present disclosure.

The display 605 is configured to display a user interface (UI). The UI may include a graph, a text, an icon, a video, and any combination thereof. When the display 605 is a touch display, the display 605 is further capable of acquiring a touch signal on or above a surface of the display 605. The touch signal may be inputted as a control signal to the processor 601 for processing. In this case, the display 605 may be further configured to provide a virtual button and/or a virtual keyboard, which is also referred to as a soft button and/or a soft keyboard. In some embodiments, there may be one display 605, disposed on a front panel of the terminal 600. In some other embodiments, there may be at least two displays 605, disposed on different surfaces of the terminal 600 respectively or in a folded design. In still other embodiments, the display 605 may be a flexible display, disposed on a curved surface or a folded surface of the terminal 600. Even, the display 605 may be further set in a non-rectangular irregular pattern, namely, a special-shaped screen. The display 605 may be prepared by using materials such as a liquid crystal display (LCD), an organic light-emitting diode (OLED), or the like.

The camera assembly 606 is configured to acquire an image or a video. In some embodiments, the camera assembly 606 includes a front-facing camera and a rear-facing camera. Generally, the front-facing camera is disposed on a front panel of the terminal, and the rear-facing camera is disposed on a back surface of the terminal. In some embodiments, there are at least two rear-facing cameras, which are respectively any one of a main camera, a depth-of-field camera, a wide-angle camera, and a telephoto camera, to implement a background blurring function by fusing the main camera and the depth-of-field camera, and panoramic shooting and virtual reality (VR) shooting functions or other fusing shooting functions by fusing the main camera and the wide-angle camera. In some embodiments, the camera assembly 606 may further include a flash. The flash may be a single color temperature flash, or may be a double color temperature flash. The double color temperature flash is a combination of a warm light flash and a cold light flash, and may be used for light compensation under different color temperatures.

The audio circuit 607 may include a microphone and a speaker. The microphone is configured to collect sound waves of a user and an environment, and convert the sound waves into electric signals and input the electrical signals into the processor 601 for processing, or input the electrical signals into the radio frequency circuit 604 to implement voice communication. For the purpose of stereo sound collection or noise reduction, there may be a plurality of microphones, respectively disposed at different parts of the terminal 600. The microphone may be further an array microphone or an omnidirectional collection microphone. The speaker is configured to convert electric signals from the processor 601 or the radio frequency circuit 604 into sound waves. The speaker may be a conventional thin-film speaker or a piezoelectric ceramic speaker. In a case that the speaker is the piezoelectric ceramic speaker, electric signals not only can be converted into sound waves audible to human, but also can be converted into sound waves inaudible to human for ranging and other purposes. In some embodiments, the audio circuit 607 may further include an earphone jack.

The positioning component 608 is configured to position a current geographic location of the terminal 600, to implement a navigation or a location based service (LBS). The positioning component 608 may be a positioning component based on the Global Positioning System (GPS) of the United States, the BeiDou system of China, or the Grenas system of Russia, or the GALILEO system of the EU.

The power supply 609 is configured to supply power for various components in the terminal 600. The power supply 609 may be an alternating current, a direct current, a disposable battery, or a rechargeable battery. When the power supply 609 includes the rechargeable battery, the rechargeable battery may support wired charging or wireless charging. The rechargeable battery may be further configured to support a fast charge technology.

In some embodiments, the terminal 600 further includes one or more sensors 610. The one or more sensors 610 include, but are not limited to: an acceleration sensor 611, a gyroscope sensor 612, a pressure sensor 613, a fingerprint sensor 614, an optical sensor 615, and a proximity sensor 616.

The acceleration sensor 611 may detect acceleration on three coordinate axes of a coordinate system established by the terminal 600. For example, the acceleration sensor 611 may be configured to detect components of gravity acceleration on the three coordinate axes. The processor 601 may control, according to a gravity acceleration signal collected by the acceleration sensor 611, the touch display 605 to display the user interface in a landscape view or a portrait view. The acceleration sensor 611 may be further configured to collect game or user motion data.

The gyroscope sensor 612 may detect a body direction and a rotation angle of the terminal 600. The gyroscope sensor 612 may cooperate with the acceleration sensor 611 to collect a 3D action performed by the user on the terminal 600. The processor 601 may implement the following functions according to the data collected by the gyroscope sensor 612: motion sensing (such as changing the UI according to a tilt operation of the user), image stabilization at shooting, game control, and inertial navigation.

The pressure sensor 613 may be disposed on a side frame of the terminal 600 and/or a lower layer of the display 605. When the pressure sensor 613 is disposed on the side frame of the terminal 600, a holding signal of the user on the terminal 600 may be detected. The processor 601 performs left and right hand recognition or a quick operation according to the holding signal collected by the pressure sensor 613. When the pressure sensor 613 is disposed on the lower layer of the touch display 605, the processor 601 controls an operable control on the UI according to a pressure operation of the user on the touch display 605. The operable control includes at least one of a button control, a scroll bar control, an icon control and a menu control.

The fingerprint sensor 614 is configured to collect a fingerprint of a user, and the processor 601 identifies an identity of the user according to the fingerprint collected by the fingerprint sensor 614, or the fingerprint sensor 614 identifies an identity of the user according to the collected fingerprint. When the identity of the user is identified as a trusted identity, the processor 601 authorizes the user to perform a related sensitive operation. The sensitive operation includes unlocking a screen, viewing encrypted information, downloading software, payment, changing settings, and the like. The fingerprint sensor 614 may be disposed on a front surface, a back surface, or a side surface of the terminal 600. When the terminal 600 is provided with a physical button or a vendor logo, the fingerprint sensor 614 may be integrated with the physical button or the vendor logo.

The optical sensor 615 is configured to collect ambient light intensity. In an embodiment, the processor 601 may control display brightness of the touch display 605 according to the ambient light intensity collected by the optical sensor 615. In some embodiments, when the ambient light intensity is relatively high, the display brightness of the touch display 605 is turned up. When the ambient light intensity is relatively low, the display brightness of the touch display 605 is turned down. In another embodiment, the processor 601 may further dynamically adjust a camera parameter of the camera assembly 606 according to the ambient light intensity collected by the optical sensor 615.

The proximity sensor 616, also referred to as a distance sensor, is usually disposed on the front panel of the terminal 600. The proximity sensor 616 is configured to collect a distance between a user and the front surface of the terminal 600. In an embodiment, when the proximity sensor 616 detects that the distance between the user and the front surface of the terminal 600 gradually becomes smaller, the touch display 605 is controlled by the processor 601 to switch from a screen-on state to a screen-off state. In a case that the proximity sensor 616 detects that the distance between the user and the front surface of the terminal 600 gradually becomes larger, the touch display 605 is controlled by the processor 601 to switch from the screen-off state to the screen-on state.

A person skilled in the art may understand that the structure shown in FIG. 6 does not constitute a limitation to the terminal 600, and the terminal may include more or fewer components than those shown in the figure, or some components may be combined, or a different component deployment may be used.

In some embodiments, the terminal 600 includes at least one processor and at least one memory configured to store instructions executable by the at least one processor, wherein the at least one processor is configured to perform the method for transmitting resources in the foregoing embodiments by executing the instructions.

In some embodiments, a non-transitory storage medium including at least one instruction is further provided, for example, a memory including at least one instruction. The at least one instruction may be executed by a processor in a terminal to perform the method for transmitting resources in the foregoing embodiment. In some embodiments, the foregoing storage medium may be a non-transitory computer-readable storage medium. For example, the non-transitory computer-readable storage medium may include a read-only memory (ROM), a random access memory (RAM), a compact disc read-only memory (CD-ROM), a magnetic tape, a floppy disk, an optical data storage device, or the like.

In some embodiments, a computer program product is further provided, including at least one instruction. The at least one instruction is executed by a processor of a terminal, to perform the method for transmitting resources provided in the foregoing embodiments.

What is claimed is:

1. A method for transmitting resources, comprising:
   determining an estimated cache volume of at least one candidate code rate based on bandwidth information and a media cache volume at a target moment, wherein the estimated cache volume indicates a media cache volume expected to continue downloading a current group of pictures at a corresponding code rate from the target moment to an end of downloading;
   in a case that there is no multimedia resource with the estimated cache volume of the at least one candidate code rate greater than a first threshold, determining a current code rate as a target code rate;
   in a case that there is one or more multimedia resources with the estimated cache volume of the at least one candidate code rate greater than the first threshold, determining a largest candidate code rate among candidate code rates corresponding to the estimated cache volume greater than the first threshold as the target code rate;
   in a case that there is one or more multimedia resources with the estimated cache volume of the at least one candidate code rate greater than or equal to a second threshold, determining a largest candidate code rate among candidate code rates corresponding to the estimated cache volume greater than or equal to the second threshold as the target code rate;
   in a case that there is no multimedia resource with the estimated cache volume of the at least one candidate code rate greater than or equal to the second threshold, calculating a reference cache volume referring to a cache volume expected to continue downloading at the current code rate until the current group of pictures is downloaded, and determining a code rate corresponding to a largest cache volume among the estimated cache volume and the reference cache volume as the target code rate, wherein the first threshold is greater than the second threshold;
   acquiring target address information of a multimedia resource having the target code rate, in response to the target code rate being inconsistent with a current code rate; and
   sending a frame acquiring request carrying the target address information to a server, wherein the frame acquiring request is configured for instructing the server to return media frames of the multimedia resource at the target code rate.

2. The method according to claim 1, wherein:
   the target moment is a play start-up moment of the multimedia resource; or
   the target moment is a download completion moment of any group of pictures in the multimedia resource; or
   the target moment is a play moment of any media frame in the multimedia resource.

3. The method according to claim 1, further comprising:
determining a play start-up code rate specified by a play business or a default play code rate of a media presentation description as the target code rate, in a case that the target moment is a play start-up moment of the multimedia resource.

4. The method according to claim 1, further comprising:
determining target position information in response to the target code rate being inconsistent with the current code rate, wherein the target position information indicates an initial pulling position for the media frames of the multimedia resource; and
inserting the target position information into the frame acquiring request carrying the target address information.

5. The method according to claim 4, wherein said determining target position information comprises:
based on the target moment being a play start-up moment of the multimedia resource, determining the target position information based on a cache duration specified by a play business.

6. The method according to claim 4, wherein said determining the target position information comprises:
based on the target moment being a download completion moment of any group of pictures in the multimedia resource, determining a timestamp of a first frame in a next group of pictures of the any group of pictures as the target position information.

7. The method according to claim 4, wherein said determining the target position information comprises:
based on the target moment being a play moment of any media frame in the multimedia resource, determining a timestamp of a first frame in a currently downloaded group of pictures as the target position information.

8. The method according to claim 1, further comprising:
ignoring the target code rate and continuously transmitting the multimedia resource at the current code rate, in response to the target code rate being consistent with the current code rate.

9. The method according to claim 1, further comprising:
playing a media frame with a highest code rate among a plurality of code rates in a process of playing the multimedia resource in response to presence of same media frames with the plurality of code rates in a cache.

10. An apparatus for transmitting resources, comprising:
at least one processor; and
at least one memory configured to store instructions executable by the at least one processor;
wherein the at least one processor is configured to perform the following operations by executing the instructions:
determining an estimated cache volume of at least one candidate code rate based on bandwidth information and a media cache volume at a target moment, wherein the estimated cache volume indicates a media cache volume expected to continue downloading a current group of pictures at a corresponding code rate from the target moment to an end of downloading;
in a case that there is no multimedia resource with the estimated cache volume of the at least one candidate code rate greater than a first threshold, determining a current code rate as a target code rate;
in a case that there is one or more multimedia resources with the estimated cache volume of the at least one candidate code rate greater than the first threshold, determining a largest candidate code rate among candidate code rates corresponding to the estimated cache volume greater than the first threshold as the target code rate;
in a case that there is one or more multimedia resources with the estimated cache volume of the at least one candidate code rate greater than or equal to a second threshold, determining a largest candidate code rate among candidate code rates corresponding to the estimated cache volume greater than or equal to the second threshold as the target code rate;
in a case that there is no multimedia resource with the estimated cache volume of the at least one candidate code rate greater than or equal to the second threshold, calculating a reference cache volume referring to a cache volume expected to continue downloading at the current code rate until the current group of pictures is downloaded, and determining a code rate corresponding to a largest cache volume among the estimated cache volume and the reference cache volume as the target code rate, wherein the first threshold is greater than the second threshold;
acquiring target address information of a multimedia resource having the target code rate, in response to the target code rate being inconsistent with a current code rate; and
sending a frame acquiring request carrying the target address information to a server, wherein the frame acquiring request is configured for instructing the server to return media frames of the multimedia resource at the target code rate.

11. The apparatus according to claim 10, wherein:
the target moment is a play start-up moment of the multimedia resource; or
the target moment is a download completion moment of any group of pictures in the multimedia resource; or
the target moment is a play moment of any media frame in the multimedia resource.

12. The apparatus according to claim 10, wherein the at least one processor is configured to perform the following operation by executing the instructions:
in a case that the target moment is a play start-up moment of the multimedia resource, determining a play start-up code rate specified by a play business or a default play code rate of a media presentation description as the target code rate.

13. The apparatus according to claim 10, wherein the at least one processor is further configured to perform the following operations by executing the instructions:
determining target position information in response to the target code rate being inconsistent with the current code rate, wherein the target position information indicates an initial pulling position for the media frames of the multimedia resource; and
inserting the target position information into the frame acquiring request carrying the target address information.

14. The apparatus according to claim 13, wherein the at least one processor is configured to perform the following operation by executing the instructions:
based on the target moment being a play start-up moment of the multimedia resource, determining the target position information based on a cache duration specified by a play business; or
based on the target moment being a download completion moment of any group of pictures in the multimedia resource, determining a timestamp of a first frame in a next group of pictures of the any group of pictures as the target position information; or based on the target moment being a play moment of any media frame in the multimedia resource, determining a timestamp of a first frame in a currently downloaded group of pictures as the target position information.

15. The apparatus according to claim 10, wherein the at least one processor is further configured to perform the following operation by executing the instructions:

ignoring the target code rate and continuously transmitting the multimedia resource at the current code rate, in response to the target code rate being consistent with the current code rate.

16. A non-transitory storage medium, wherein at least one instruction in the storage medium, when executed by at least one processor of a terminal, causes the terminal to perform the following operations:

determining an estimated cache volume of at least one candidate code rate based on bandwidth information and a media cache volume at a target moment, wherein the estimated cache volume indicates a media cache volume expected to continue downloading a current group of pictures at a corresponding code rate from the target moment to an end of downloading;

in a case that there is no multimedia resource with the estimated cache volume of the at least one candidate code rate greater than a first threshold, determining a current code rate as a target code rate;

in a case that there is one or more multimedia resources with the estimated cache volume of the at least one candidate code rate greater than the first threshold, determining a largest candidate code rate among candidate code rates corresponding to the estimated cache volume greater than the first threshold as the target code rate;

in a case that there is one or more multimedia resources with the estimated cache volume of the at least one candidate code rate greater than or equal to a second threshold, determining a largest candidate code rate among candidate code rates corresponding to the estimated cache volume greater than or equal to the second threshold as the target code rate;

in a case that there is no multimedia resource with the estimated cache volume of the at least one candidate code rate greater than or equal to the second threshold, calculating a reference cache volume referring to a cache volume expected to continue downloading at the current code rate until the current group of pictures is downloaded, and determining a code rate corresponding to a largest cache volume among the estimated cache volume and the reference cache volume as the target code rate, wherein the first threshold is greater than the second threshold;

acquiring target address information of a multimedia resource having the target code rate, in response to the target code rate being inconsistent with a current code rate; and sending a frame acquiring request carrying the target address information to a server, wherein the frame acquiring request is configured for instructing the server to return media frames of the multimedia resource at the target code rate.

* * * * *